(12) United States Patent
Bonner et al.

(10) Patent No.: US 10,213,760 B2
(45) Date of Patent: Feb. 26, 2019

(54) CATALYTIC REACTORS COMPRISING DISTRIBUTED TEMPERATURE SENSORS

(71) Applicant: CompactGTL Limited, London (GB)

(72) Inventors: Christopher William Bonner, Staffordshire (GB); Benjamin Dannatt, North East Lincolnshire (GB)

(73) Assignee: CompactGTL Limited, London (GB)

( * ) Notice: Subject to any disclaimer, the term of this patent is extended or adjusted under 35 U.S.C. 154(b) by 0 days.

(21) Appl. No.: 15/322,889

(22) PCT Filed: Jul. 1, 2015

(86) PCT No.: PCT/GB2015/051922
§ 371 (c)(1),
(2) Date: Dec. 29, 2016

(87) PCT Pub. No.: WO2016/001663
PCT Pub. Date: Jan. 7, 2016

(65) Prior Publication Data
US 2017/0136432 A1    May 18, 2017

(30) Foreign Application Priority Data
Jul. 4, 2014   (GB) .................................. 1412000.0

(51) Int. Cl.
*B01J 15/00*    (2006.01)
*B01J 19/00*    (2006.01)
(Continued)

(52) U.S. Cl.
CPC ......... *B01J 15/005* (2013.01); *B01J 19/0013* (2013.01); *B01J 19/0093* (2013.01);
(Continued)

(58) Field of Classification Search
CPC .. B01J 15/005; B01J 19/0093; B01J 19/0013; B01J 19/249; C01B 3/384; C10G 2/34
(Continued)

(56) References Cited

U.S. PATENT DOCUMENTS 6,009,216 A * 12/1999 Pruett .................. E21B 17/206
219/502
7,172,735 B1 * 2/2007 Lowe .................... B01F 5/0604
422/603
(Continued)

FOREIGN PATENT DOCUMENTS

DE    102009042994 A1    3/2011
EP        2098842 A1 *  9/2009 ............. G01K 11/32
(Continued)

OTHER PUBLICATIONS

International Search Report and Written Opinion received in corresponding PCT Application PCT/GB2015/051922, dated Oct. 13, 2015.

*Primary Examiner* — Huy Tram Nguyen
(74) *Attorney, Agent, or Firm* — Vorys, Sater, Seymour and Pease LLP

(57) ABSTRACT

A catalytic reactor is provided comprising a plurality of first flow channels including a catalyst for a first reaction; a plurality of second flow channels arranged alternately with the first flow channels; adjacent first and second flow channels being separated by a divider plate (13a, 13b), and a distributed temperature sensor such as an optical fiber cable (19). The distributed temperature sensor may be located within the divider plate, or within one or 10 more of the flow channels.

11 Claims, 4 Drawing Sheets

(51) Int. Cl.
  *B01J 19/24*   (2006.01)
  *C01B 3/38*    (2006.01)
  *C10G 2/00*    (2006.01)
(52) U.S. Cl.
  CPC ............ *B01J 19/249* (2013.01); *C01B 3/384* (2013.01); *C10G 2/34* (2013.01); *B01J 2219/002* (2013.01); *B01J 2219/00058* (2013.01); *B01J 2219/0086* (2013.01); *B01J 2219/0097* (2013.01); *B01J 2219/00225* (2013.01); *B01J 2219/00783* (2013.01); *B01J 2219/00786* (2013.01); *B01J 2219/00822* (2013.01); *B01J 2219/00835* (2013.01); *B01J 2219/00873* (2013.01); *B01J 2219/00961* (2013.01); *B01J 2219/00986* (2013.01); *B01J 2219/2453* (2013.01); *B01J 2219/2459* (2013.01); *B01J 2219/2462* (2013.01); *B01J 2219/2465* (2013.01); *B01J 2219/2479* (2013.01); *B01J 2219/2481* (2013.01); *B01J 2219/2486* (2013.01); *B01J 2219/2497* (2013.01); *C01B 2203/0233* (2013.01); *C01B 2203/0811* (2013.01)

(58) Field of Classification Search
  USPC .......................................................... 422/602
  See application file for complete search history.

(56) References Cited

U.S. PATENT DOCUMENTS

| | | | |
|---|---|---|---|
| 7,738,084 B1* | 6/2010 | Korman | ................... G01F 1/661 356/28 |
| 2009/0189617 A1* | 7/2009 | Burns | ...................... E21B 43/24 324/649 |
| 2010/0089584 A1* | 4/2010 | Burns | ................. E21B 43/2401 166/302 |

FOREIGN PATENT DOCUMENTS

| | | |
|---|---|---|
| WO | 2004031708 A1 | 4/2004 |
| WO | 2014096779 A1 | 6/2014 |

* cited by examiner

CATALYTIC REACTORS COMPRISING DISTRIBUTED TEMPERATURE SENSORS

The present invention relates to a chemical reactor, particularly but not exclusively a chemical reactor in which an exothermic reaction occurs. The invention also relates to the control of a reaction taking place in such a chemical reactor. It would be relevant, for example, to a plant and a process for treating natural gas to produce a liquid product, particularly but not exclusively for performing steam methane reforming followed by Fischer-Tropsch synthesis.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquids or waxes under ambient conditions. The two stages of the process, steam/methane reforming and Fischer-Tropsch synthesis, require different catalysts, and heat to be transferred to or from the reacting gases, respectively, as the reactions are respectively endothermic and exothermic. Reactors for these reactions may be formed as a stack of plates, with flow channels defined between the plates, the flow channels for the different fluids alternating in the stack. Suitable catalysts for the reactions taking place within the flow channels may be provided.

As described in WO 01/51194 the catalyst may be supported on an insert which may take the form of a foil. Alternatively, catalyst may be applied directly to the walls of the flow channel. In a further alternative, the catalyst may be provided as catalyst particles which may form a bed of particles. The term "particles" means, for example, pellets, spheres, extrudates, trilobes, powders, granules, fibres, particulates, particulate solids or any solid components comprising the catalyst material that are suitable for use in the catalytic reactor. The particles may be arranged in a bed of particles.

One advantage of this reactor configuration, with alternate flow channels carrying different fluids, is that heat can be transferred efficiently between first and second flow channels. As a result, very active catalysts can be used resulting in a high level of process intensification. However, if heat is not transferred away sufficiently rapidly a thermal runaway may occur which may result in damage to the catalyst. Repeated thermal runaways may even compromise the integrity of the reactor as a whole. As a result, control of the reactions taking place within these reactors is key to ensuring the longevity of the catalyst and also the reactor.

Thermocouples are typically employed to monitor temperature. WO 2014/096779 discloses a reactor block having a plurality of alternately arranged flow channels, wherein the plurality of flow channels are arranged such that fluids in at least two adjacent flow channels can exchange heat through an intervening wall, and wherein the intervening wall defines at least one channel extending within the reactor block and communicating with an outside surface of the block and is dimensioned to accommodate a temperature sensor.

The temperature sensors are thermocouples of around 1 mm diameter and they are disposed between the channels within the intervening wall.

According to an aspect of the present invention there is provided a catalytic reactor comprising a plurality of first flow channels including a catalyst for a first reaction; a plurality of second flow channels arranged alternately with the first flow channels; adjacent first and second flow channels being separated by a divider plate; and a distributed temperature sensor provided within the divider plate. The provision of a distributed temperature sensor provides a much greater degree of flexibility in relation to the frequency of measurement and also the location of measurement in comparison with the thermocouples used in the art.

The distributed temperature sensor may be a fibre optic cable. The fibre optic cable may follow a tortuous path through the divider plates in order to provide temperature data for all of the adjacent first and second flow channels. A fibre optic cable may be provided in each divider plate. The distributed temperature sensor does not provide point temperature measurements, but provides average temperatures over successive portions of its length. It may be preferable to perform such an average in a direction where there is little temperature variation. The temperature will usually vary more significantly in the flow direction than transverse to the flow direction, so it may therefore be beneficial to arrange the path of the distributed temperature sensor so it is transverse to the flow direction in the first flow channels.

Alternatively, in another aspect of the invention, the distributed temperature sensor (such as a fibre optic cable) may be provided within one or more first flow channels and/or one or more second flow channels. This configuration provides more direct measurement of the temperature of the process fluids. However, the environment within the flow channel will be more hostile than within the divider plate, which may limit the useful lifetime of the fibre optic cable.

The first flow channels may include a Fischer-Tropsch catalyst and the second channels carry a heat transfer fluid, in use. Alternatively, the first flow channels include a steam methane reforming catalyst and the second channels further include a combustion catalyst.

The reactor of the present invention may be included in a plant for performing Fischer-Tropsch synthesis, together with a data analysis device. The plant may further comprise a control system operatively linked to the data analysis device.

The control system may be configured to shut in the reactor if the data analysis device detects a rate of change of temperature in excess of a predetermined value. Temperature measurements obtained from optical fibre cables are much less susceptible to noise than thermocouples described in WO 2014/096779.

The reactor may comprise a stack of plates. For example, the flow channels may be defined by thin metal sheets that are castellated and stacked alternately with flat sheets; the edges of the flow channels may be defined by sealing strips. Flow channels may alternatively be defined between flat plates by spacer bars. The stack of plates forming the reactor is bonded together for example by diffusion bonding, brazing, or hot isostatic pressing.

The invention will now be further and more particularly described, by way of example only, and with reference to the accompanying drawings, in which:

FIG. 1b shows a sectional view of a modification to the reactor of FIG. 1a;

FIG. 2b shows a cut-away view of the reactor block of FIG. 2a;

FIG. 4 shows a modification to the reactor block of FIG. 2a.

The invention is of relevance to a chemical process for converting natural gas (primarily methane) to longer chain hydrocarbons. The first stage of this process may use steam reforming to form synthesis gas, that is to say the reaction of the type:

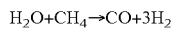

This reaction is endothermic, and may be catalysed by a rhodium or platinum/rhodium catalyst in a flow channel. The heat required to cause this reaction may be provided by combustion of an inflammable gas such as methane or hydrogen, which is exothermic and may be catalysed by a platinum/palladium catalyst in an adjacent second gas flow channel.

The synthesis gas is then used to perform Fischer-Tropsch synthesis to generate a longer chain hydrocarbon, that is to say:

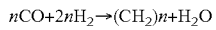

which is an exothermic reaction, occurring at an elevated temperature, typically between 190° C. and 280° C., and an elevated pressure typically between 1.5 MPa and 2.5 MPa (absolute values), in the presence of a catalyst such as iron, cobalt or fused magnetite. A suitable catalyst for the Fischer-Tropsch synthesis comprises a coating of gamma-alumina of specific surface area 140-230 m2/g with about 10-40% cobalt (by weight compared to the alumina), and with a promoter such as ruthenium, platinum or gadolinium which is less than or equal to 10% the weight of the cobalt, and a basicity promoter such as lanthanum oxide.

The synthesis gas stream is cooled and compressed to the elevated pressure, say 2.0 MPa, and is then fed to a catalytic Fischer-Tropsch reactor. The Fischer-Tropsch reactor may be a compact catalytic reactor formed from a stack of plates as herein described; the reactant mixture flows through one set of channels, while a coolant flows through the other set.

Figure 1A:
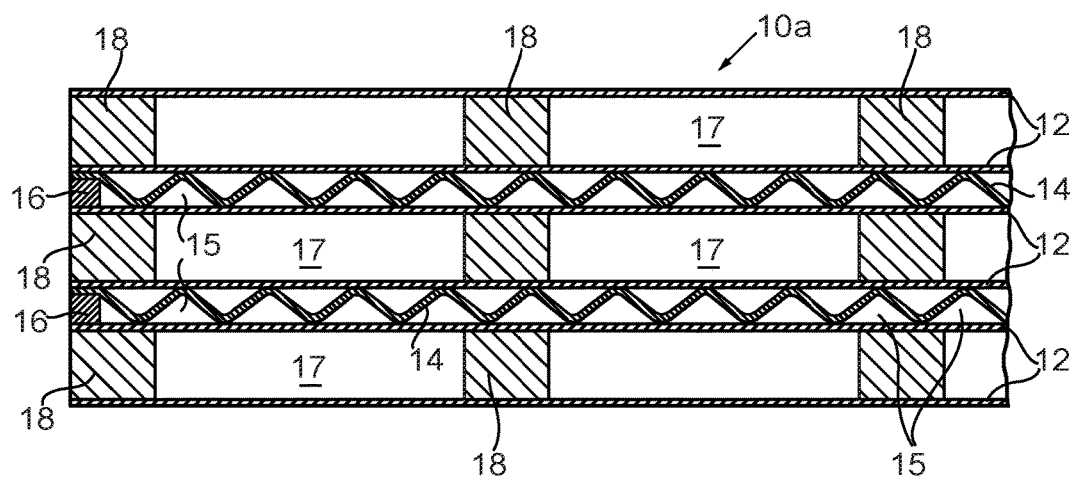
FIG. 1a shows a sectional view of part of a reactor suitable for Fischer-Tropsch synthesis.

Referring now to FIG. 1a there is shown a reactor block 10a suitable for use in performing Fischer-Tropsch synthesis, the reactor block 10a being shown in section and only in part. The reactor block 10a consists of a stack of flat plates 12 of thickness 1 mm spaced apart so as to define channels 15 for a coolant fluid alternating with channels 17 for the Fischer-Tropsch synthesis. The coolant channels 15 are defined by sheets 14 of thickness 0.75 mm shaped into flat-topped sawtooth corrugations. The height of the corrugations (typically in the range 1 to 4 mm) is 2 mm in this example, and correspondingly thick solid edge strips 16 are provided along the sides, and the wavelength of the corrugations is 12 mm (the arrangement being described in more detail below). The channels 17 for the Fischer-Tropsch synthesis are of height 5 mm (typically within a range of 1 mm to 10 mm), being defined by bars 18 of square or rectangular cross-section, 5 mm high, spaced apart by 80 mm (the spacing typically being in a range of 20-100 mm) and so defining straight through channels.

Figure 1B:
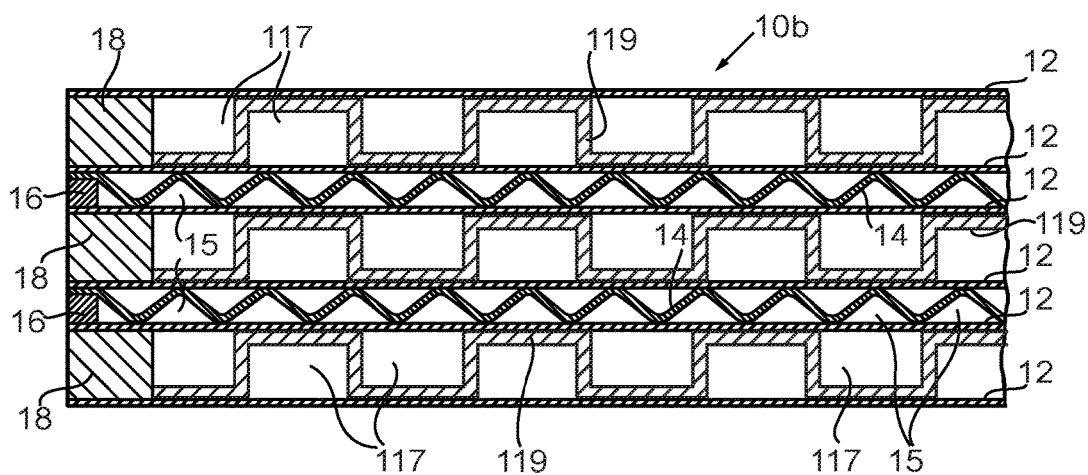

Referring now to FIG. 1b there is shown an alternative reactor block 10b suitable for use in performing Fischer-Tropsch synthesis, the reactor block 10b being shown in section and only in part. In many respects the reactor block 10b resembles the reactor block 10a, identical components being referred to by the same reference numerals. The reactor block 10b consists of a stack of flat plates 12 of thickness 1 mm spaced apart so as to define channels 15 for a coolant fluid alternating with channels 117 for the Fischer-Tropsch synthesis. The coolant channels 15 are defined in addition by sheets 14 of thickness 0.75 mm shaped into flat-topped sawtooth corrugations as described above, with solid edge strips 16. The channels 117 for the Fischer-Tropsch synthesis are sealed by solid edge bars 18 and are defined in addition by sheets 119 of thickness 1.0 mm shaped into castellations of height in the range of 4 mm to 12 mm, preferably 5 mm. In the preferred example the resulting channels 117 are of width 7 mm and of height 6 mm and extend straight through the stack from one face to the opposite face. As with the channels 15, 17 within the reactor block 10a, the channels 15 and 117 in reactor block 10b extend in parallel.

The reactor blocks 10a or 10b may be made by stacking the components that define the channels 15 and 17 or 117, and then bonding them together for example by brazing or by diffusion bonding. If the reactor block 10a or 10b is to be used for Fischer-Tropsch synthesis, the reactor block 10a or 10b is then turned through 90° so that the channels 15 and 17 are upright in use. If the reactor block 10a or 10b is to be used for steam methane reforming or other reactions, it may not be necessary to turn it through 90° as it is less critical that the channels 15 and 17 are upright for these reactions. In each case the first flow channels 17 or 117 would be then provided with a catalyst (not shown) for the Fischer-Tropsch reaction.

Each plate 12 may for example be 1.3 m by 1.3 m, or 1.2 m by 0.8 m, so the channels 17 would be 1.3 m long or 0.8 m long, respectively. Preferably the channels 17 are no more than 1.5 m long, and preferably at least 0.3 m long. Although only a few layers of the stack are shown, the reactor block 10a or 10b might in practice have ten, twenty or thirty layers containing the reaction channels 17, or as many as 100 such layers. The flat plates 12, the bars 18, and the castellated sheets 14 and 119 may be of a high-temperature steel alloy, or of an aluminium alloy, for example 3003 grade (aluminium with about 1.2% manganese and 0.1% copper).

Figure 2A:
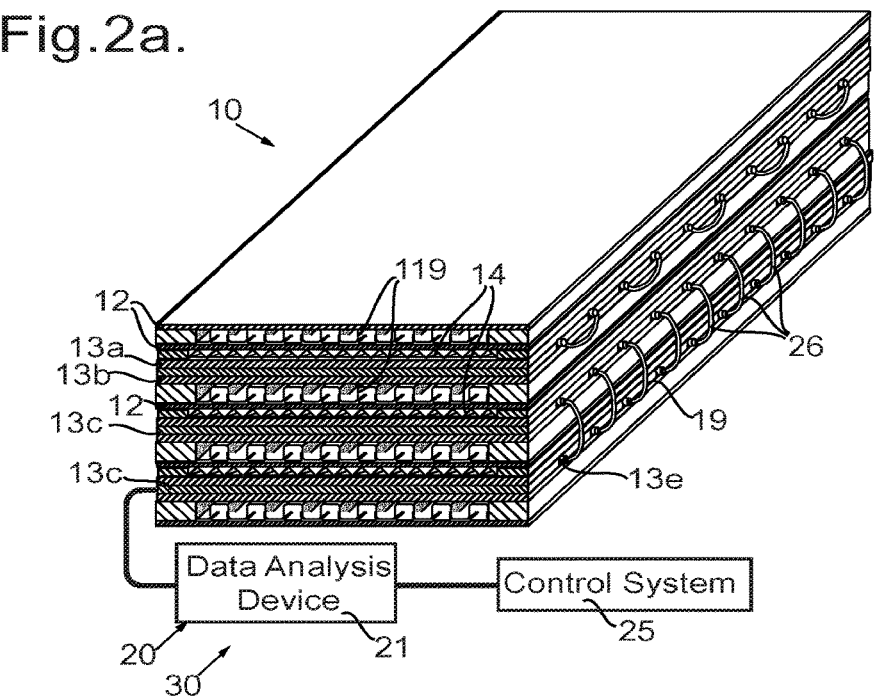
FIG. 2a shows a perspective view of a reactor block according to the present invention.
Figure 2B:
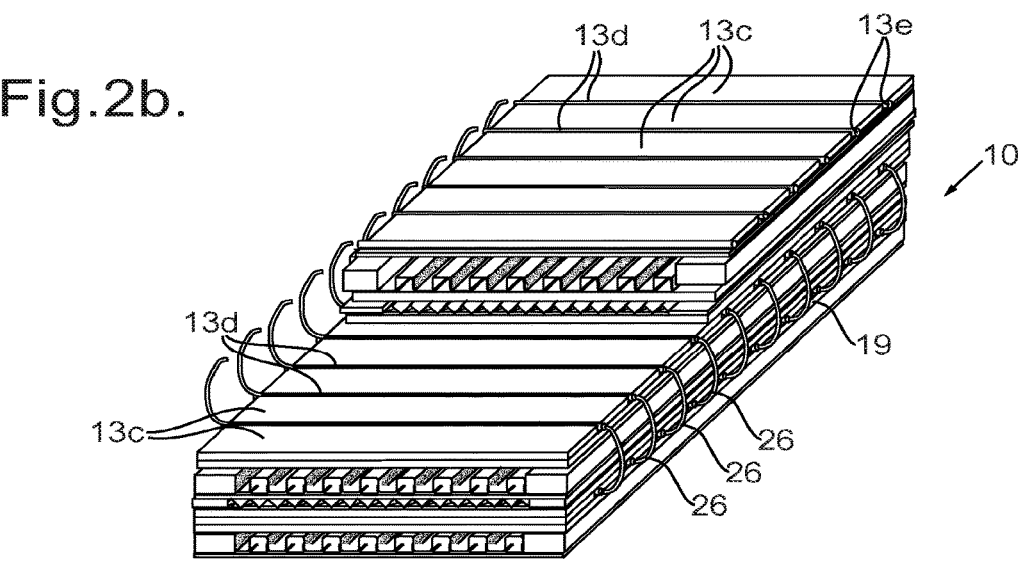

Referring now to FIGS. 2a and 2b, these show perspective views of portions of a reactor block 10 of the present invention. The reactor block 10 is shown as being constructed as described above for the reactor block 10b, but alternatively it might be constructed as in the reactor block 10a. It differs from the reactor block 10b only in that at least one of the flat plates 12 is formed of two divider plates 13a, 13b that are held apart by multiple rectangular plates 13c arranged side-by-side, but spaced slightly apart so as to define narrow gaps 13d between successive plates 13c. Within each such narrow gap 13d is a tube 13e, the external diameter of the tube 13e being the same as the thickness of the rectangular plates 13c. All of these components 13a-13e are bonded together during assembly of the reactor block 10, as described above. It will be appreciated that an alternative reactor block of the invention would differ from the reactor block 10a only in that at least one of the flat plates 12 would be formed by divider plates 13a, 13b along with the requisite rectangular plates 13c and the tubes 13e as described above.

A fibre optic cable 19 is passed through each of the tubes 13e between the divider plates 13a, 13b. The fibre optic cable 19 forms a distributed temperature sensor 20 which is configured to measure the temperature at multiple positions along the fibre optic cable 19 using a data analysis device 21. The fibre optic cable 19 has a diameter of less than 1 mm, which ensures that it can pass through the tubes 13e in the reactor block 10. The fibre optic cable 19 may have multiple cores which provide the capability of providing multiple temperature measurements, for example providing the facility for making measurements from opposite ends of the fibre optic cable 19, by sending optical pulses in opposite directions along separate cores or fibres within the fibre optic cable 19.

As illustrated schematically in FIGS. 2a and 2b, the fibre optic cable 19 makes a number of passes through the reactor block 10 resulting, overall, in a tortuous path. At the point where the fibre optic cable 19 leaves the reactor block 10, it forms a loop 26 taking it to the next selected entry point into the reactor block 10. The positioning of the fibre optic cable 19 is dictated by the tubes 13e provided between the divider plates 13a, 13b. The fibre optic cable 19 makes a substantially straight line path from the entrance to the exit of each tube 13e. The tubes 13e are sized to conform closely to the diameter of the fibre optic cable 19 so that the position of the fibre optic cable 19 is known and movement of the cable 19 is minimised. It will be appreciated that the tubes 13e and therefore the corresponding portions of the fibre-optic cable 19 extend in directions that are transverse to the flow direction through the reaction channels 17.

The positions of the tubes 13e are selected to provide an even coverage of the reactor volume in order to ensure reliable and safe temperature monitoring throughout the life of the reactor block 10. However, under some circumstances (not illustrated), it may be preferable to intensify the monitoring of temperature in certain sections of the reactor block 10. This may be effected by providing additional narrow gaps 13d and tubes 13e in some parts of the reactor block 10 so that the distance between consecutive passes of the optical fibre cable 19 through the reactor block 10 is reduced. This may be applicable in part of a reactor block 10 which is known to be susceptible to thermal excursions.

Overall, the reactor block 10 may have over one thousand such tubes 13e for temperature measurements. For example, there may be ten, twenty or fifty tubes 13e in each divider plate 13a, 13b. The reactor block 10 may be provided with divider plates 13a, 13b between each castellated sheet 14 so that a fibre optic cable 19 can be provided to obtain temperature data pertaining to the temperature in the immediately adjacent flow channels 15, 17 for each of the ten, twenty or one hundred layers of the reactor block 10.

The temperature measurements obtained from the distributed temperature sensor 20 are averages over successive short lengths of the cable 19 (for example over successive 1 m, 25 cm or 12 cm lengths). This ensures that any temperature excursion will be captured by the data analysis device 21. The temperature is measured at regular intervals, throughout the length of the cable 19. Data is then extracted by the data analysis device 21 by analysing signals from along the length of the fibre optic cable 19. The length of successive data point locations is currently limited by the data processing capacity of the data analysis device 21, and may for example be successive 12 cm lengths of the optical fibre 19. The data analysis device uses the Boxcar method to minimise repetition in data collected. In this context, the Boxcar method allows an exception to be set at, for example, 0.5° C., and then data is only recorded if it differs from the previously recorded value by more than this amount, which may be called the exception quantum. This reduces the amount of data to be analysed, without reducing the accuracy or frequency of the measurement.

The measurement frequency is a trade-off between the time interval and the accuracy of data required. For example, for a time interval of 10 s, a 1° C. change in temperature may be detected to an accuracy of 0.2° C. For a 5° C. change in temperature, the accuracy of measurement is 0.4° C. for a 60 s time interval, but 0.18° C. for a 5 minute time interval. The accuracy increases the longer the time interval, that is to say the time between successive measurements. During particularly sensitive operations, such as the start-up of a reactor block 10, it may be preferable to increase the frequency of measurement.

The data analysis device 21 may be an Optical Time Domain Reflectometer or a Optical Frequency Domain Reflectometer or it may be a combined device comprising the functionality of both time and frequency domain reflectometry. The data analysis device 21 is configured to analyse all data collected from the fibre optic cable 19. The extent and nature of this analysis will change according to the reactor conditions and the nature of the procedures being carried out. For example, during normal operation of the reactor block 10, the temperature measurements from the entire reactor block 10 may be analysed in order to provide maximum temperature, minimum temperature, average temperature and rate of change of temperature across the reactor block 10 as a whole.

In addition, the full temperature profile of the reactor block 10 may be calculated. This additional data may be accessed periodically during normal operation, for example on a daily basis. This may provide an early indication of degradation of the catalyst in part of the reactor block 10 if the operating temperature in that part of the reactor block 10 differs from the average temperature calculated across the reactor block 10 as a whole.

Moreover, access to the full profile will be especially useful during sensitive operations such as start-up of the reactor block 10 and during such operations the full profile may be calculated continuously. In addition the data analysis device 21 may be configured to respond to reactor conditions, for example, providing full profile data when the rate of change of temperature exceeds a predetermined threshold which may be indicative of a thermal runaway.

The data analysis device 21 is linked to a control system 25 used to control the operation of the reactor block 10. The data analysis device 21, control system 25 and reactor block 10 may collectively be referred to as the plant 30. The data analysis device 21 is configured to provide some level of automatic control of the reactor block 10. If the rate of change of temperature exceeds a predetermined value, the data analysis device 21 is configured to send a signal to the control system 25 to effect either a change in the composition of the feed gas or a partial or total shutdown of the reactor block 10. For example, when a first predetermined threshold is reached, the percentage of inert gases in the feed may be increased to slow the reaction. If this does not stabilise the temperature within the reactor block 10 and a second predetermined threshold value is reached for the rate of change of temperature, then the reactor may be shut in under 100% inert gases. The data analysis device 21 may have multiple channels, each of which obtains data from one fibre optic cable 19. There may be 2, 4, 6, 8 or more channels. Each fibre optic cable 19 may be up to 2 km long. For example it may be 1.5 m, 50 m, 500 m or 1 km long.

Figure 3A:
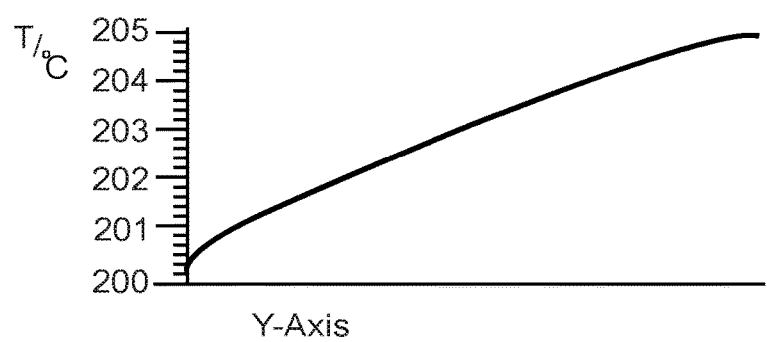
FIGS. 3a and 3b are graphs showing the temperature profile along the length of the reactor of FIG. 2a under different circumstances.

FIG. 3 shows two examples of temperature profiles of a reactor block 10. The flow channels 17 through which the reagents for the Fischer-Tropsch synthesis reaction flow run parallel to the Y-axis. In each case the full temperature profile showed no significant variation in temperature, T, across the width of the reactor block 10; in FIG. 3 the temperature profiles are shown along the Y-axis, that is to say in the direction of flow in the channels 17. FIG. 3a shows the temperature profile of the reactor block 10 in a steady state of a Fischer-Tropsch synthesis reaction. The temperature T rises initially in the first 20% of the length of the reactor block 10. The temperature T then falls throughout the remaining length of the reactor block 10. The temperature T varies between a maximum of 205° C. and a minimum of 200° C., averaging 202° C. The maximum rate of change of temperature is no more than 0.1° C./min (and may in practice be zero).

Figure 3B:
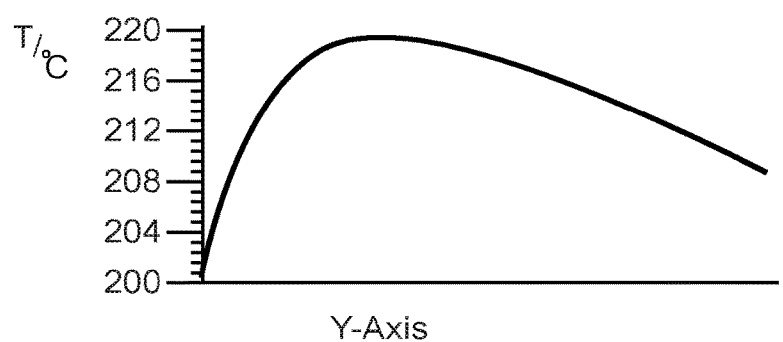

FIG. 3b shows an instantaneous example of a temperature profile of the reactor block 10 when a thermal runaway is taking place. The temperature in the first quarter of the length of the reactor block 10 rises very steeply before dropping quite steeply. The high temperatures in the first part of the reactor block 10 cause all of the reagents to be used and therefore the reaction rate in the remainder of the reactor block 10 is lower than it would be under steady state conditions. The maximum temperature is 220° C. and the minimum is 200° C., averaging 205° C. The maximum rate of change of temperature is 0.8° C./min.

It will be appreciated that since measurements are taken for example over successive 12 cm lengths along the optical fibre 19, with a wide reactor block there may be several measurements taken at different positions across the width of the reactor block 10. So not only can temperature variations along the length of the reactor block 10 be monitored, but temperature variations across the width can also be monitored. The increased level of detail in temperature throughout the reactor block 10 (for example as shown in FIGS. 3a and 3b), enables the process to be further optimised and thereby operated closer to operating boundaries, reducing the required safety margins and thereby increasing yield.

The provision of the fibre optic cable 19 within the divider plates 13a, 13b enables the fibre optic cable 19 to be replaced without opening up the reactor block 10. Whilst the fibre optic cable 19 should be capable of withstanding a thermal runaway, there may still be circumstances in which replacing the fibre optic cable 19 may be preferable. Although the fibre-optic cable 19 is shown only shown as passing through a single reactor block 10, it will be appreciated that a continuous fibre-optic cable 19 may either be provided with an end termination (not shown) at the end remote from the data analysis device 21, or may be passed in a similar way through tubes 13e in another such reactor block 10.

Figure 4:
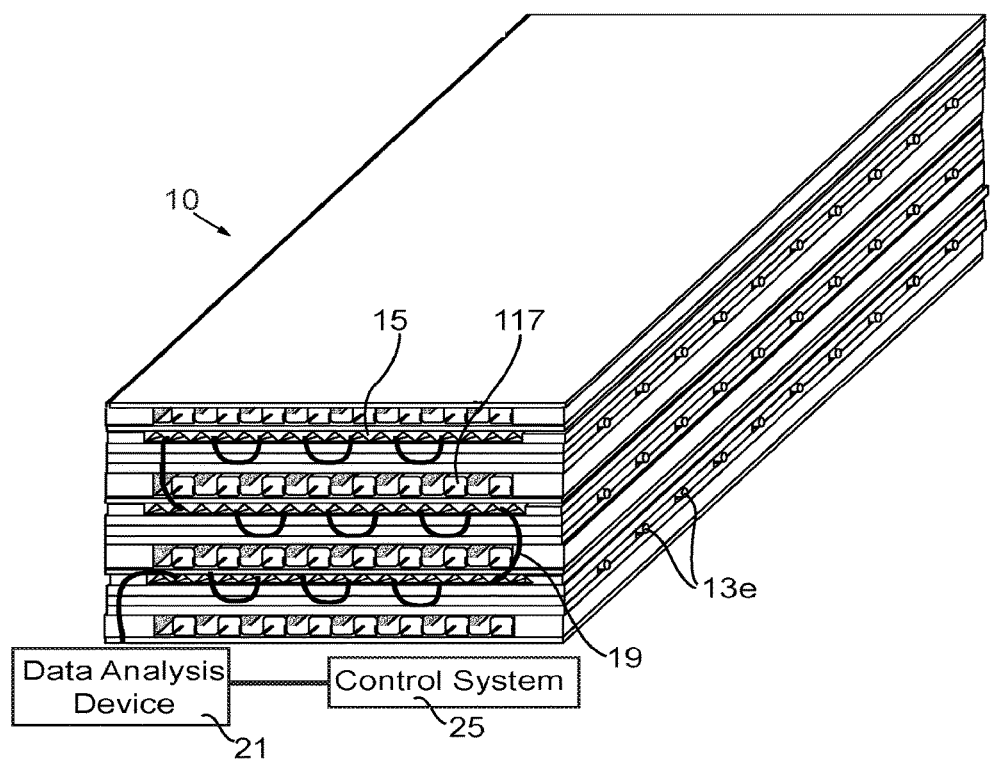

Referring now to FIG. 4, there is shown a modification to the reactor block 10 suitable for use in performing Fischer-Tropsch synthesis. The reactor block 10 is shown in section and only in part. The reactor block 10 is the same as the reactor block 10 of FIG. 2a in that it consists of a stack of flat plates 12 of thickness 1 mm spaced apart so as to define channels 15 for a coolant fluid alternating with channels 117 for the Fischer-Tropsch synthesis. In this modification a fibre optic cable 19 is arranged within the second flow channels 15, through which the coolant flows, in use. In another alternative, the fibre-optic cable 19 may instead extend through the first flow channels 117 in which the reagents for Fischer-Tropsch synthesis flow in use. The provision of the fibre optic cable 19 in the process channel, rather than within the divider plates, makes it more sensitive to temperature excursions, but it is a more hostile environment in the process channel in comparison with the divider plate and therefore the operational lifetime of the fibre optic cable 19 may be compromised. In a further alternative one fibre optic cable 19 may extend through the flow channels 15, as shown in FIG. 4, or through the flow channels 117, and another fibre-optic cable 19 may extend through the tubes 13e, as shown in FIG. 2a.

It will be appreciated that the size of the reaction channel 17 or 117 may differ from that described above. However, the reaction channels 17 or 117 are preferably at least 1 mm deep, preferably at least 2 mm deep, to provide adequate space for catalyst; and are preferably no more than 20 mm deep, more preferably no more than 10 mm deep, as it is difficult to ensure substantially uniform temperature throughout such a deep channel. The smallest dimension of the cross section of the first flow channel may be greater than or equal to 1 mm and less than or equal to 50 mm. The smallest dimension of the cross section of the first flow channel may be greater than or equal to 2 or 4 or 6 or 8 or 10 mm and less than or equal to 50 mm. The smallest dimension of the cross section of the first flow channel may be greater than or equal to 2 or 4 or 6 or 8 or 10 mm and less than or equal to 20 mm. The smallest dimension of the cross section of the first flow channel may be greater than or equal to 2 or 4 or 6 or 8 mm and less than or equal to 10 mm. The smallest dimension of the cross section of the first flow channel may be greater than or equal to 2 or 4 or 6 mm and less than or equal to 8 mm.

The smallest dimension of the cross section of the first flow channel may be the same or similar to the orthogonal dimension of the cross section of the first flow channel. A reactor provided with at least first flow channels that are substantially square in cross section may be particularly advantageous where an insert structure is used in each first flow channel, either a catalyst-carrying insert or an insert solely for enhancing heat transfer.

Conversely, a reactor provided with elongate channels, in which a first dimension orthogonal to the sheets considerably exceeds the extent of the channel in the direction 12 parallel to the sheets 12, may provide advantages when a highly active catalyst is used. The elongation of the channel in the first direction reduces the total number of layers provided within a reactor of a given size and therefore the amount of metal used may also be reduced. This may result in considerable cost savings. This elongate dimension is balanced by the smaller extent of the channel in the orthogonal direction. This provides a reduced heat transfer distance to the fins on either side of the channel, and aids the structural integrity of the reactor.

Where the chemical reaction is endothermic, then the heat transfer fluid in the second flow channels may be a hot fluid, or may be a fluid which undergoes an exothermic reaction such as combustion. Where the chemical reaction is exothermic, then the heat transfer fluid in the second flow channels may be a coolant fluid. By way of example the catalytic reactor may be for performing Fischer-Tropsch synthesis.

It should be understood that the Fischer-Tropsch reaction is a comparatively slow reaction. The purpose of the Fischer-Tropsch synthesis is to generate hydrocarbons in which the carbon chain is longer than that of methane, and indeed preferably at least C5 and so are normally liquids or waxes. A practical reactor must therefore generate a significant quantity of such longer-chain hydrocarbons per unit time, and should be selective towards the formation of such longer-chain hydrocarbons rather than methane. It has been found that providing a greater volumetric loading of active catalyst material can enhance both the conversion of CO to hydrocarbons, and also the productivity of the desired hydrocarbons.

The Fischer-Tropsch reaction is typically carried out at a temperature less than or equal to 300° C. and typically about 200° C., so a wide range of materials may be selected for the reactor. For example the reactor may be made of an aluminium alloy, stainless steel, high-nickel alloys, or other steel alloys. It should be realized that the foregoing example embodiments should not be construed as limiting. Other variations and modifications will be apparent to persons skilled in the art upon reading the present application.

Moreover, the disclosure of the present application should be understood to include any novel features or any novel combination of features either explicitly or implicitly disclosed herein or any generalization thereof, and during the prosecution of the present application or of any application derived therefrom, new claims may be formulated to cover any such features and/or combination of such features.

The invention claimed is:

1. A catalytic reactor comprising
   a plurality of first flow channels including a catalyst for a first reaction;
   a plurality of second flow channels arranged alternately with the first flow channels;
   adjacent first and second flow channels being separated by a divider plate; and
   a fibre optic cable distributed temperature sensor provided within the one or more first flow channels.

2. The catalytic reactor according to claim 1, further comprising a fibre optic cable within the divider plate.

3. The catalytic reactor according to claim 2, wherein the fibre optic cable follows a tortuous path through the divider plates in order to provide temperature data for all of the adjacent first and second flow channels.

4. The catalytic reactor according to claim 2, wherein a fibre optic cable is provided in each divider plate.

5. The catalytic reactor according to claim 1, wherein the fibre optic cable is provided within one or more second flow channels.

6. The catalytic reactor according to claim 1, wherein the first flow channels include a Fischer-Tropsch catalyst and the second channels carry a heat transfer fluid, in use.

7. The catalytic reactor according to claim 1, wherein the first flow channels include a steam methane reforming catalyst and the second channels further include a combustion catalyst.

8. A plant for performing Fischer-Tropsch synthesis, the plant comprising a catalytic reactor according to claim 1, and a data analysis device.

9. The plant according to claim 8, further comprising a control system operatively linked to the data analysis device.

10. The plant according to claim 9, wherein the control system is configured to shut in the reactor if the data analysis device detects a rate of change of temperature in excess of a predetermined value.

11. The catalytic reactor according to claim 5, wherein a fibre optic cable is provided in each divider plate.

* * * * *